United States Patent
Ueda et al.

(10) Patent No.: US 12,158,455 B2
(45) Date of Patent: Dec. 3, 2024

(54) PREPARATIVE LIQUID CHROMATOGRAPH

(71) Applicant: SHIMADZU CORPORATION, Kyoto (JP)

(72) Inventors: Shiori Ueda, Kyoto (JP); Tomohiro Shagawa, Kyoto (JP); Soichiro Tamaoki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 246 days.

(21) Appl. No.: 17/702,849

(22) Filed: Mar. 24, 2022

(65) Prior Publication Data

US 2022/0317101 A1    Oct. 6, 2022

(30) Foreign Application Priority Data

Apr. 5, 2021   (JP) ................. 2021-064133

(51) Int. Cl.
*G01N 30/86*    (2006.01)
*G01N 30/02*    (2006.01)
(Continued)

(52) U.S. Cl.
CPC ......... *G01N 30/8631* (2013.01); *G01N 30/16* (2013.01); *G01N 30/82* (2013.01); *G01N 2030/027* (2013.01)

(58) Field of Classification Search
CPC .... G01N 30/8631; G01N 30/16; G01N 30/82; G01N 2030/027
See application file for complete search history.

(56) References Cited

U.S. PATENT DOCUMENTS

2004/0018118 A1*  1/2004  Waki ............... G01N 30/78
                                              422/70

FOREIGN PATENT DOCUMENTS

JP    2004-45263 A    2/2004
JP    2010014559 A    1/2010

OTHER PUBLICATIONS

Office Action for corresponding for Chinese Patent Application No. 202210175914.6 dated Aug. 18, 2023, with English machine translation.

(Continued)

*Primary Examiner* — Kristina M Deherrera
*Assistant Examiner* — Jean F Morello
(74) *Attorney, Agent, or Firm* — Renner, Otto, Boisselle & Sklar, LLP

(57) ABSTRACT

A separation column (6), an injector (4) that injects a sample into a mobile phase flowing through a flow path (16) leading to the separation column (6), at least one detector (8;10) that is fluidly connected downstream of the separation column (6), and generates a plurality of detector signals different from each other derived from a component in a sample separated by the separation column (6), a fraction collector (12) for fractionating and collecting a portion containing a component separated by the separation column (6) in an eluate from the separation column (6) into an individual collection container, and a controller (14) that detects a component peak in a plurality of chromatograms based on each of a plurality of the detector signals and controls operation of the fraction collector (12) based on a result of the detection are included. The controller (14) includes a fractionating collection part (26) configured to execute fractionating collection in which a portion detected as a component peak only in one chromatogram of a plurality of the chromatograms and a portion detected as a component peak in all of a plurality of the chromatograms are collected separately in collection containers different from each other.

4 Claims, 3 Drawing Sheets

(51) Int. Cl.
*G01N 30/16* (2006.01)
*G01N 30/82* (2006.01)

(56) References Cited

OTHER PUBLICATIONS

Office Action for corresponding for Chinese Patent Application No. 202210175914.6 issued Aug. 2, 2024, with English machine translation.
Office Action for corresponding for Chinese Patent Application No. 202210175914.6 issued May 20, 2024, with English machine translation.
Office Action for corresponding Japanese Patent Application No. 2021-064133 issued Apr. 16, 2024, with English machine translation.

\* cited by examiner

PREPARATIVE LIQUID CHROMATOGRAPH

BACKGROUND OF THE INVENTION

1. Field of the Invention

The present invention relates to a preparative liquid chromatograph.

2. Description of the Related Art

A preparative chromatograph device that separates a plurality of components contained in a sample by using a chromatograph device such as a high performance liquid chromatograph, and fractionates and collects each component is known. The preparative liquid chromatograph includes a sample separation part having a liquid delivery pump and a separation column, a detector provided at a subsequent stage of the sample separation part, a fraction collector, and a controller that controls these. Components in a sample temporally separated by the separation column are detected as peaks in a chromatogram based on a detector signal generated by a detector such as a spectrophotometer. The controller controls operation of the fraction collector so that a portion containing a component detected as a peak in the chromatogram in an eluate from the separation column is collected in an individual collection container.

In a preparative liquid chromatograph, there is a case where a plurality of detector signals is acquired by using a plurality of detectors having different detection systems in combination, and components are fractionated based on a plurality of chromatograms based on the detector signals (see Japanese Patent Laid-open Publication No. 2004-45263). Further, there is a case where a plurality of detector signals is acquired by one detector, and components are fractionated based on a plurality of chromatograms based on the detector signals. By using a plurality of detector signals in combination, a component that cannot be detected by only one detector signal can be complementarily detected, detection accuracy can be improved, and collection omission of a component can be prevented.

SUMMARY OF THE INVENTION

In a preparative liquid chromatograph in which components are fractionated based on a plurality of detector signals, a fractionation method under an "OR" condition in which all portions detected as peaks in a chromatogram of any of the detector signals are collected in individual collection containers can be executed in addition to a fractionation method under an "AND" condition in which only a portion detected as a peak in chromatograms of all the detector signals is collected in an individual collection container. However, in these fractionation methods, there is a case where high purity fractionation cannot be sufficiently performed for a plurality of components having peaks partially overlapping each other.

Therefore, an object of the present invention is to provide a preparative liquid chromatograph capable of fractionating with high purity a component whose peak partially overlaps a peak of another component.

A preparative liquid chromatograph according to the present invention is a preparative liquid chromatograph including a separation column, an injector that injects a sample into a mobile phase flowing through a flow path leading to the separation column, at least one detector that is fluidly connected downstream of the separation column, and generates a plurality of detector signals different from each other derived from components of the sample separated by the separation column, a fraction collector for fractionating a plurality of portions of eluate from the separation column containing each of the components separated by the separation column and collecting the portions into individual collection containers, and a controller that performs detection of component peaks in a plurality of chromatograms based on each of a plurality of the detector signals and controls operation of the fraction collector based on a result of the detection. The controller includes a fractionating collection part configured to execute fractionating collection in which a portion of the eluate detected as a component peak only in one chromatogram of the plurality of chromatograms and a portion of the eluate detected as a component peak in all of the plurality of chromatograms are collected separately in collection containers different from each other.

In the preparative liquid chromatograph according to the present invention, a portion detected as a component peak only in one chromatogram of a plurality of chromatograms based on each of a plurality of detector signals and a portion detected as a component peak in all of a plurality of the chromatograms can be collected in collection containers different from each other separately. Therefore, in a case where there is a component in which a part of a peak overlaps with a peak of another component, a portion having high purity not overlapping with a peak of another component can be collected in an individual container. Therefore, a preparative liquid chromatograph capable of fractionating a component in a portion not overlapping with a peak of another component with high purity in a case where the peak partially overlaps with a peak of another component can be provided.

DETAILED DESCRIPTION OF THE INVENTION

Hereinafter, an embodiment of a preparative liquid chromatograph according to the present invention will be described with reference to the accompanying drawings.

Figure 1:
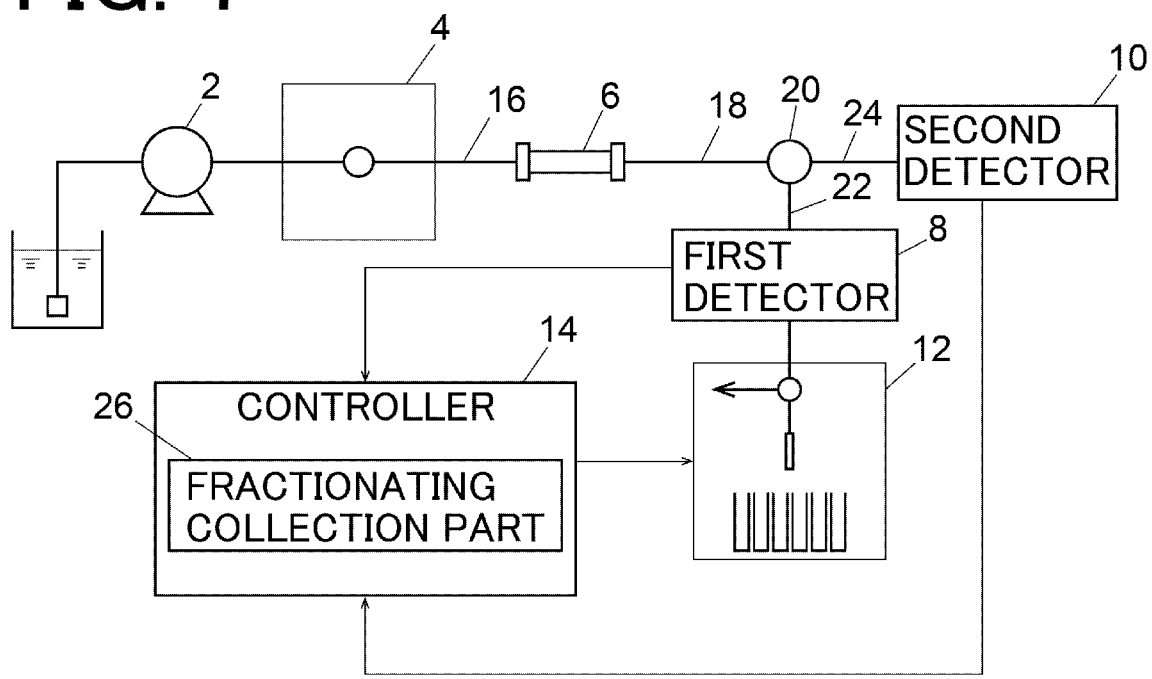
FIG. 1 is a schematic configuration diagram illustrating an embodiment of a preparative liquid chromatograph.

As illustrated in FIG. 1, the preparative liquid chromatograph of the present embodiment includes a liquid delivery pump 2, an injector 4, a separation column 6, a plurality of detectors 8 and 10, a fraction collector 12, and a controller 14. Note that, in the present embodiment, two detectors of the first detector 8 and the second detector 10 are provided. However, the present invention is not limited to this, and any configuration may be employed as long as a plurality of different detector signals can be obtained. For example, only one detector capable of generating a plurality of different detector signals by itself may be provided, or three or more detectors may be provided.

The liquid delivery pump 2 delivers a mobile phase to the separation column 6 through a flow path 16. The injector 4 injects a sample into a mobile phase flowing through the flow path 16. Components in a sample are separated from each other in the separation column 6. A flow path 18 downstream of the separation column 6 communicates with a splitter 20. The splitter 20 divides an eluate from the separation column 6 into a flow path 22 leading to the first detector 8 and a flow path 24 leading to the second detector 10 at a predetermined ratio. The fraction collector 12 is provided downstream of the first detector 8. Most of the eluate from the separation column 6 is introduced into the first detector 8 and the fraction collector 12 through a flow path 22.

The first detector 8 and the second detector 10 are detectors having different detection systems, and generate different signals as detector signals derived from components in the eluate from the separation column 6. The first detector 8 is, for example, a UV detector, and the second detector 10 is, for example, a mass spectrometer. The fraction collector 12 is a device for fractionating and collecting a portion containing a component separated by the separation column 6 in the eluate from the separation column 6 into an individual collection container.

The controller 14 is realized by one or a plurality of computer devices including a central processing part (CPU) and an information storage device. The controller 14 creates two chromatograms based on detector signals generated by the first detector 8 and the second detector 10, detects a component peak in each of the chromatograms, and controls operation of the fraction collector 12 so that a portion containing a component detected as a peak in the eluate from the separation column 6 is collected in an individual collection container.

A detection condition (level, slope, or the like) of a peak in each chromatogram can be optionally set by the user to the controller 14. Further, collection conditions such as whether all peaks detected in any chromatogram are collected (condition: OR) and whether only a peak portion detected in any chromatogram is collected (condition: AND) may also be set by the user to the controller 14.

Figure 2:
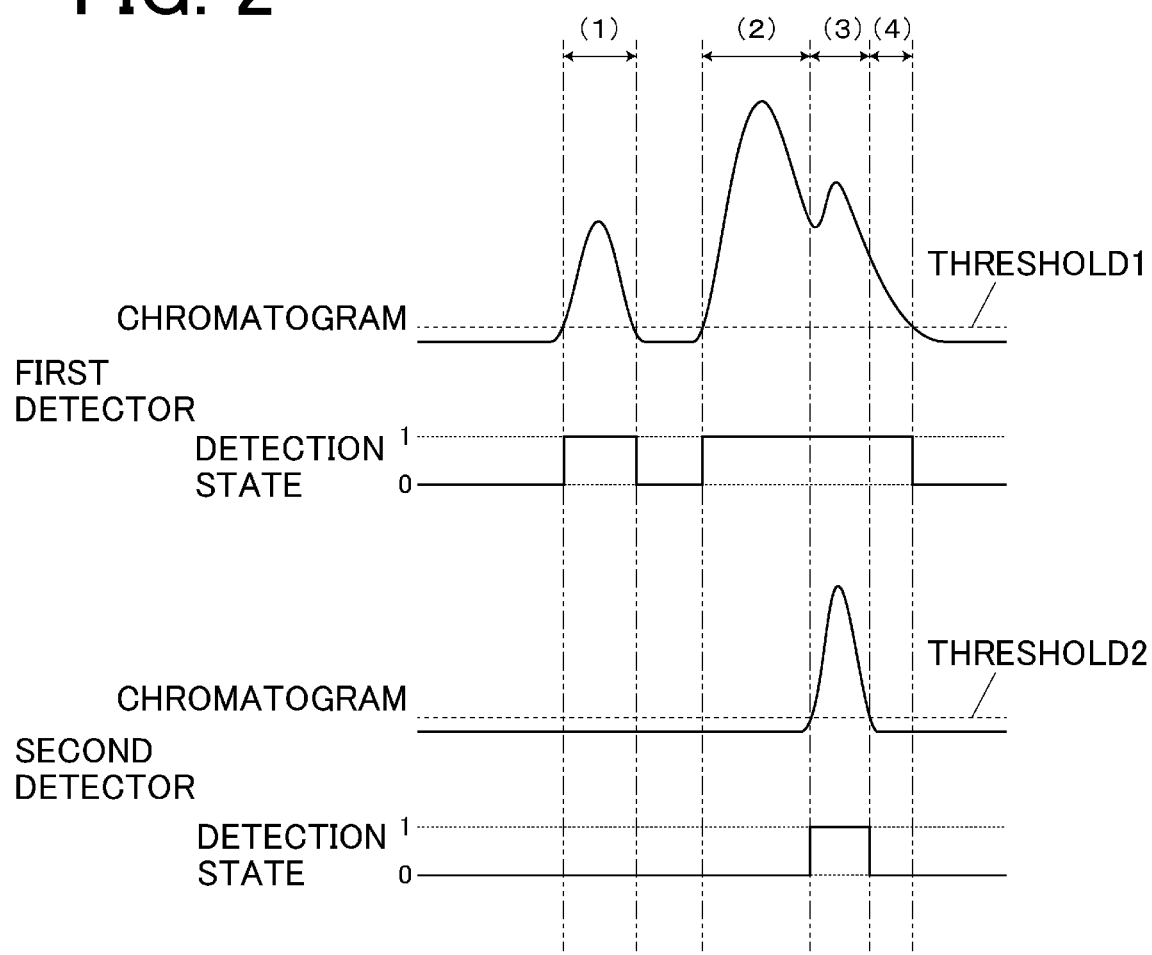
FIG. 2 is a graph illustrating an example of a chromatogram based on detection signals of two detectors in the embodiment and a detection state of a component peak.

FIG. 2 illustrates an example of a chromatogram based on a detector signal of the first detector 8 and a chromatogram based on a detector signal of the second detector 10. In FIG. 2, time axes (horizontal axes) of the two chromatograms coincide with each other. Below each chromatogram, a detection state of a peak in each chromatogram when a detection state when no peak is detected=0 and a detection state when a peak is detected=1 is shown. In this example, a peak in each chromatogram is detected using a threshold of a signal level.

In FIG. 2, detection states (a peak detection state of the first detector and a peak detection state of the second detector) of peaks in the chromatograms in portions of (1) to (4) are (1,0), (1,0), (1,1), and (1,0), respectively. Focusing on the portions of (2) to (4), it is considered that two components are present in an overlapping manner in the portion of (3), and only a single component is present in the portions of (2) and (4). In a case where the collection condition is set to "AND", only the portion of (3) whose detection state is (1,1) is collected in a collection container, and when the collection condition is set to "OR", the portion of (1) is collected in a collection container, and the portions of (2) to (4) are collected together in one collection container. As described above, when the collection conditions are simply set to "AND" and "OR", it is not possible to collect a portion not mixed with another component among components appearing as peaks in the portions of (2) to (4) in the chromatogram of the first detector 8, that is, the portions of (2) and (4) separately from the portion of (3).

The controller 14 includes a fractionating collection part 26 for collecting the portions of (2), (3), and (4) in an individual collection container in the chromatogram as shown in FIG. 2. The fractionating collection part 26 is a function obtained by a CPU executing a predetermined program. The fractionating collection part 26 executes fractionating collection in which a portion where a peak is detected in only any one of the chromatogram of the first detector 8 and the chromatogram of the second detector 10 and a portion where a peak is detected in both the chromatogram of the first detector 8 and the chromatogram of the second detector 10 are collected in different collection containers by, for example, changing a collection container used for collection to a new collection container by using a change in a detection state of a peak as a trigger. The fractionating collection function by the fractionating collection part 26 may be enabled/disabled optionally by the user.

Figure 3:
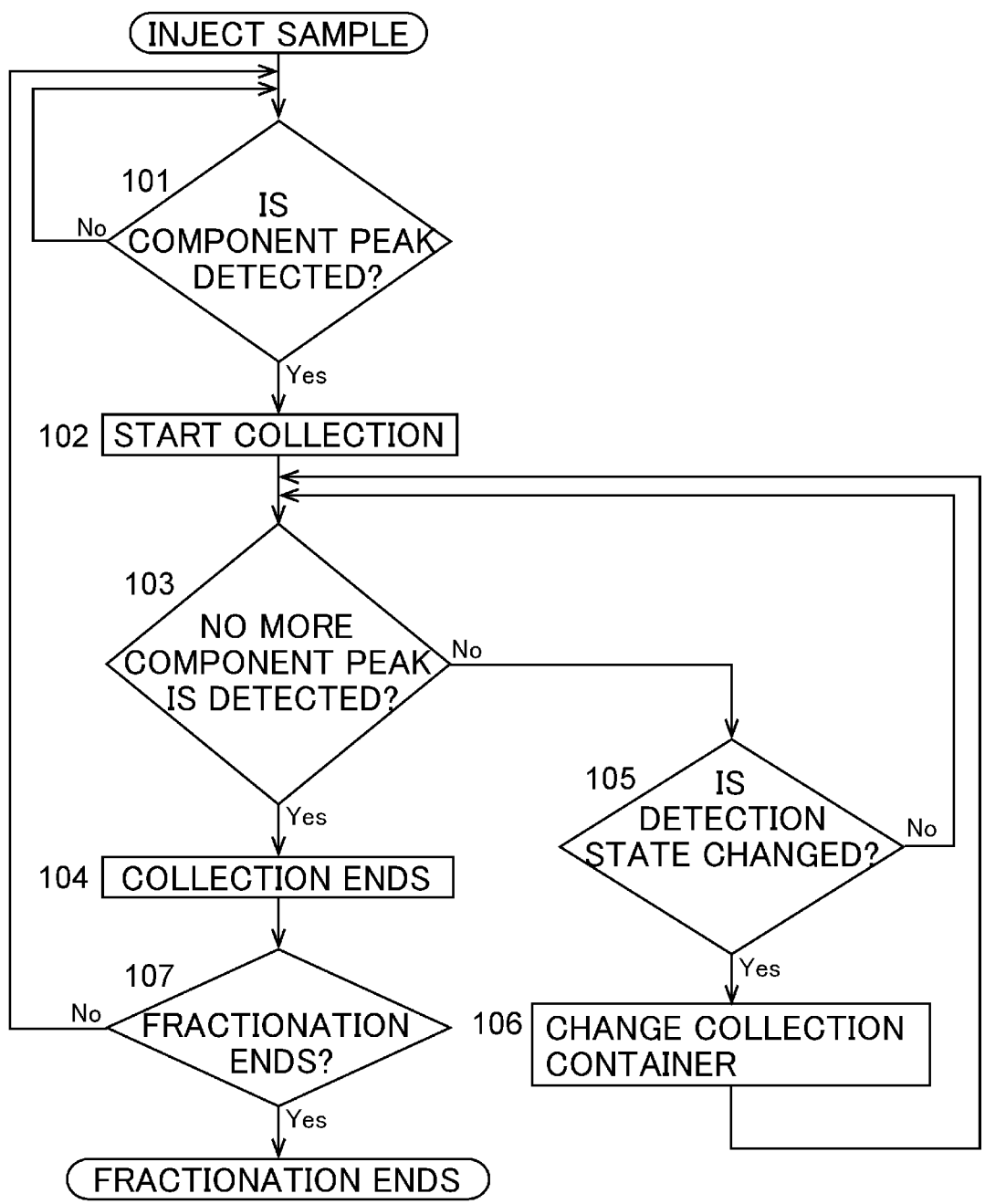
FIG. 3 is a flowchart illustrating an example of fractionation operation of the embodiment.

An example of fractionation operation in a case where the fractionating collection function by the fractionating collection part 26 is enabled will be described with reference to FIG. 1 and a flowchart of FIG. 3.

When a sample is injected into a mobile phase by the injector 4 and fractionation is started, the controller 14 monitors a detection state of a component peak in a chromatogram based on a detector signal generated by each of the first detector 8 and the second detector 10 (Step 101). In a case where a component peak is detected in at least any one of the chromatograms (Step 101: Yes), the controller 14 controls the fraction collector 12 so that a component detected as the peak is collected in a collection container (Steps 102 and 103).

When a detection state of the peak is changed before the above collection operation ends (Step 105), the fractionating collection part 26 controls the fraction collector 12 so that the collection container used for collection is changed to a new collection container (Step 106). In the example of FIG. 2, when transition is made from the portion of (2) to the portion of (3) and the detection state changes from (1,0) to (1,1), and further when transition is made from the portion of (3) to the portion of (4) and the detection state changes from (1,1) to (1,0), the fractionating collection part 26 detects the change in the detection state and transmits a control signal to the fraction collector 12 to change the collection container to be used for collection to a new container. In this manner, in the example of FIG. 2, the portions of (2), (3), and (4) are collected in separate collection containers. Note that changing the collection container used for collection to a new container means moving a probe to which an eluate from the separation column 6 is dropped to a position over another collection container.

The operation of collecting a peak component ends when no peak is detected in any chromatogram, that is, when the detection state becomes (0,0) (Step 104). Steps 101 to 106 described above are repeatedly executed, and fractionation operation ends when a predetermined end condition is satisfied, such as in a case where preset time elapses after start of fractionation operation (Step 107).

As described above, when the fractionating collection function by the fractionating collection part 26 is used, in a case where peaks detected in a plurality of chromatograms based on a plurality of detector signals different from each other partially overlap with each other, a portion where peaks do not overlap with each other and a portion where peaks overlap with each other are collected in separate collection containers, so that a portion having high purity, which does not overlap with a peak of another component, among components detected as peaks can be collected in an individual collection container.

Note that the embodiment described above is merely an example of an embodiment of the preparative liquid chromatograph according to the present invention. An embodiment of the preparative liquid chromatograph according to the present invention is as shown below.

One embodiment of the preparative liquid chromatograph according to the present invention includes a separation column, an injector that injects a sample into a mobile phase flowing through a flow path leading to the separation column, at least one detector that is fluidly connected downstream of the separation column, and generates a plurality of detector signals different from each other derived from components of the sample separated by the separation column, a fraction collector for fractionating a plurality of portions of eluate from the separation column containing each of the components separated by the separation column and collecting the portions into individual collection containers, and a controller that performs detection of component peaks in a plurality of chromatograms based on each of a plurality of the detector signals and controls operation of the fraction collector based on a result of the detection. The controller includes a fractionating collection part configured to execute fractionating collection in which a portion of the eluate detected as a component peak only in one chromatogram of a plurality of the chromatograms and a portion of the eluate detected as a component peak in all of a plurality of the chromatograms are collected separately in collection containers different from each other.

In a first aspect of the above embodiment, during a period from when a component peak is detected in any of the plurality of chromatograms to when no component peak is detected in any of the plurality of chromatograms, the fractionating collection part of the controller is configured to change a collection container used in the fraction collector to a new collection container each time a detection state of a component peak in a plurality of the chromatograms changes.

In a second aspect of the above embodiment, the at least one detector includes a plurality of detectors having different detection systems from each other for generating respective detector signals.

In a third aspect of the above embodiment, the controller is configured to be able to switch between enabling and disabling of a function of the fractionating collection part. According to such an aspect, the degree of freedom of the user in setting a fractionation condition is increased.

DESCRIPTION OF REFERENCE SIGNS 2 liquid delivery pump
4 injector
6 separation column
8 first detector
10 second detector
12 fraction collector
14 controller
16, 18, 22, 24 flow path
20 splitter
26 fractionating collection part

What is claimed is:

1. A preparative liquid chromatograph comprising:
a separation column;
an injector that injects a sample into a mobile phase flowing through a flow path leading to the separation column;
at least one detector that is fluidly connected downstream of the separation column, and generates a plurality of detector signals different from each other derived from components of the sample separated by the separation column;
a fraction collector for fractionating a plurality of portions of eluate from the separation column containing each of the components separated by the separation column and collecting the portions into individual collection containers; and
a controller that performs detection of component peaks in a plurality of chromatograms based on each of the plurality of detector signals and controls operation of the fraction collector based on a result of the detection, wherein
the controller includes a fractionating collection part configured to execute fractionating collection in which in comprising:
detecting a component peak in one of the plurality of chromatograms;
detecting an overlapping peak in other chromatograms of the plurality of chromatograms, wherein the detected overlapping peak at least partially overlaps with the detected component peak; collecting as an overlapping part a portion of the component peak overlapping with the overlapping peak in an overlapping collecting container; collecting as a non-overlapping part a portion of the component peak not overlapping with the overlapping peak in a non-overlapping collecting container, such that the overlapping part and the non-overlapping part are collected separately in collection containers different from each other.

2. The preparative liquid chromatograph according to claim 1, wherein during a period from when a component peak is detected in any of the plurality of chromatograms to when no component peak is detected in any of the plurality of chromatograms, the fractionating collection part of the controller is configured to change a collection container used in the fraction collector to a new collection container each time a detection state of a component peak in the plurality of chromatograms changes.

3. The preparative liquid chromatograph according to claim 1, wherein the at least one detector includes a plurality of detectors having different detection systems from each other for generating respective detector signals.

4. The preparative liquid chromatograph according to claim 1, wherein the controller is configured to be able to switch between enabling and disabling of a function of the fractionating collection part.

* * * * *